(12) United States Patent
Eliasson et al.

(10) Patent No.: US 10,174,954 B2
(45) Date of Patent: Jan. 8, 2019

(54) HOT AIR RACK OVEN

(71) Applicant: REVENT INTERNATIONAL AB, Upplands Vasby (SE)

(72) Inventors: Marten Eliasson, Taby (SE); Jerry Nordin, Jarfalla (SE)

(73) Assignee: REVENT INTERNATIONAL AB (SE)

( * ) Notice: Subject to any disclaimer, the term of this patent is extended or adjusted under 35 U.S.C. 154(b) by 512 days.

(21) Appl. No.: 15/026,664

(22) PCT Filed: Oct. 2, 2014

(86) PCT No.: PCT/EP2014/071163
§ 371 (c)(1),
(2) Date: Apr. 1, 2016

(87) PCT Pub. No.: WO2015/049337
PCT Pub. Date: Apr. 9, 2015

(65) Prior Publication Data
US 2016/0245532 A1    Aug. 25, 2016

(30) Foreign Application Priority Data

Oct. 2, 2013  (SE) ........................ 1351157
Mar. 7, 2014  (SE) ........................ 1450267

(51) Int. Cl.
*F24C 15/02*   (2006.01)
*F24C 15/16*   (2006.01)
(Continued)

(52) U.S. Cl.
CPC .............. *F24C 15/026* (2013.01); *A21B 1/44* (2013.01); *A21B 3/02* (2013.01); *F24C 15/023* (2013.01); *F24C 15/16* (2013.01)

(58) Field of Classification Search
CPC ...... F24C 15/026; F24C 15/023; F24C 15/16; A21B 3/02
See application file for complete search history.

(56) References Cited

U.S. PATENT DOCUMENTS

| 880,865 A | 3/1908 | Davis |
| 3,276,166 A | 10/1966 | Markus |

(Continued)

FOREIGN PATENT DOCUMENTS

| EP | 0 848 213 A1 | 6/1998 |
| FR | 1 365 713 A | 7/1964 |

(Continued)

OTHER PUBLICATIONS

International Search Report, dated Feb. 2, 2015, from corresponding PCT application.

(Continued)

*Primary Examiner* — David J Laux
(74) *Attorney, Agent, or Firm* — Adsero IP

(57) ABSTRACT

A hot air rack oven (1) in an oven housing (2), for the baking of goods on a rack (4), including an oven chamber (6), a door opening (8), a door (10), the oven chamber includes one or more curved portions wall and has an essentially circular cross-section with respect to a substantially vertical axis of the oven. The door is curved with a slightly larger diameter than the outer diameter of the oven chamber, and is able to slide laterally to one side of the opening, at the outside of the oven, and the sliding door is movably arranged at the oven housing via cooperation, at an upper edge of the door, between an elongated curved horizontally arranged wheel arrangement (12) provided with a specified number N of equally sized wheels $W_i$ and an elongated curved horizontally arranged guide bar (14) provided with N equally sized recesses $R_i$.

14 Claims, 8 Drawing Sheets

(51) Int. Cl.
*A61B 3/02* (2006.01)
*A21B 1/44* (2006.01)
*A21B 3/02* (2006.01)

(56) References Cited

U.S. PATENT DOCUMENTS

| | | | | |
|---|---|---|---|---|
| 3,611,637 A | * | 10/1971 | Saino | E05D 15/1021 16/90 |
| 3,954,053 A | | 5/1976 | Johansson et al. | |
| 5,461,829 A | * | 10/1995 | Lehto | E05D 15/1021 16/87 R |
| 5,857,290 A | * | 1/1999 | Schnarr | E05D 13/04 16/102 |
| 7,367,159 B2 | | 5/2008 | Delgado et al. | |
| 2009/0294441 A1 | | 12/2009 | Wen et al. | |
| 2013/0174831 A1 | * | 7/2013 | Shaffer | F24C 15/023 126/190 |

FOREIGN PATENT DOCUMENTS

| GB | 2 486 815 A | 6/2012 |
|---|---|---|
| WO | 2011010147 A1 | 8/2011 |

OTHER PUBLICATIONS

Aug. 23, 2017, EA communication issued for related EA application No. 201690579/31.

\* cited by examiner

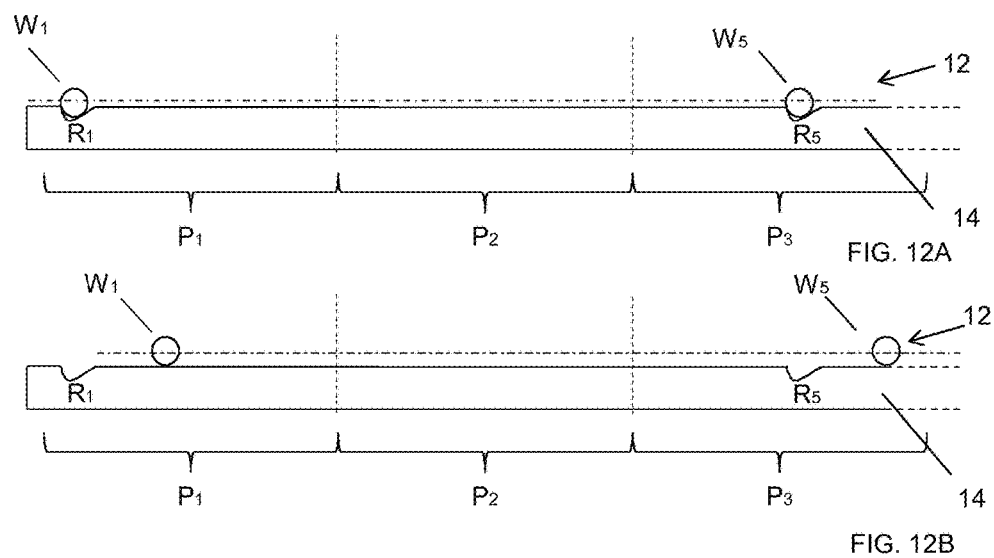
FIG. 12A
FIG. 12B
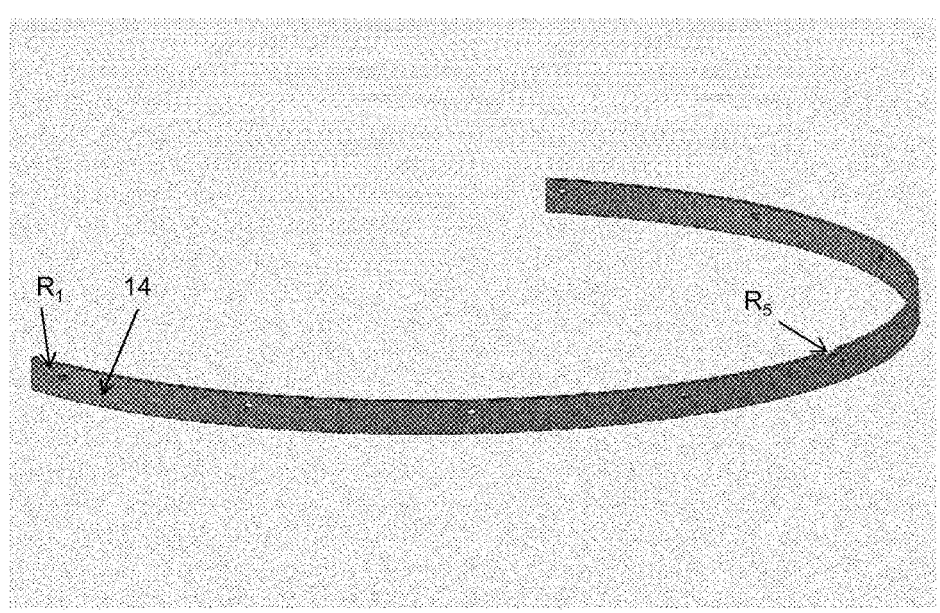
FIG. 13

HOT AIR RACK OVEN

FIELD OF THE INVENTION

The present invention relates to a hot air rack oven according to the preamble of the independent claim. In particular it relates to a wheel arrangement and a guide bar configured to cooperate in order to achieve a smooth operation of a curved sliding door of the oven.

BACKGROUND OF THE INVENTION

Hot air baker's rack ovens are known in which the goods which are to be baked are introduced on baking sheets arranged on square or rectangular trays or pans held in a quadratic wheeled rack. The rack is intended to be introduced into the oven chamber of the oven and to remain there while the baking process takes place. The oven chamber has a rectangular, square or circular horizontal cross-section (i.e. the cross-section when viewed from above is rectangular, square, or circular) and is dimensioned to accept a rack and allow it to be rotated. Hot air can be introduced via one or two corner vents into the oven chamber to bake the goods. This leads to a temperature gradient across the oven chamber which can lead to uneven cooking of the goods. In order to reduce uneven baking of the goods, the rack is rotated around a vertical axis during the baking process. This can be achieved by placing the rack on a turntable during the baking process or by lifting the rack with a rotatable hook which is rotated during the baking process. Once the baking process is finished the rack is removed (after being lowered and decoupled from the hook if such a hook is used) from the open rack oven. An example of such a rack oven is known from U.S. Pat. No. 3,954,053. This has a substantially rectangular oven chamber with a straight back wall, two parallel, spaced-apart side walls arranged perpendicular to the back wall and a door able to close off the front end of the oven chamber.

A conventional rack oven has an external housing which encloses an oven chamber, a hot air channel where hot air is about to flow and a hot air inlet in the form of a vertical series of horizontal openings in the wall of the oven chamber though which hot air is blown into the oven chamber, an exhaust outlet via which hot air is removed from the oven chamber and a door. As is normal in baker's ovens, at least some of the exhausted air is conveyed by a fan through suitable ducting past a heater and re-introduced into the oven chamber via hot air inlet.

The object of the invention is to achieve an improved rack oven being more user-friendly, more compact and having improved baking capabilities in comparison to the presently used ovens.

SUMMARY OF THE INVENTION

The above-mentioned object is achieved by the present invention according to the independent claim.

Preferred embodiments are set forth in the dependent claims.

This new type of baker's rack oven has been developed in which the front of the oven is curved and a curved door is arranged to slide laterally in an arc to one side of a door opening in order to allow access to the oven chamber.

The oven chamber, including the curved door, has an essentially circular cross-section which is advantageous in order to control the hot air flow, i.e. the air flow is unobstructed.

This results in an even heat transfer from the top to bottom of the rack and from the outer edge to the centre of the baking tray.

This is also advantageous with regard to the energy efficiency of the oven as the oven chamber volume is smaller in comparison to a corresponding conventional rack oven. Also, the floor space, the footprint, of the oven is reduced when comparing to a conventional rack oven having a rectangular cross-section for the same size of rack, which in turn has implications on the oven production process that requires less material.

By providing a curved sliding door, in combination with the circular cross-section, result in that the access to the oven chamber is made easier when placing the rack (or the trays in a fixed rack inside the oven) in the oven, or when removing the rack (or the trays in a fixed rack inside the oven). This is due to the fact that the rack is positioned closer to the opening because of the circular cross-sectional shape of the oven chamber.

In addition there is less risk for the operator to get burned when opening a curved sliding door in comparison to open a conventional hinged door.

An oven door must provide a good sealing to achieve the high requirement regarding low energy consumption.

The present invention solves a general problem with sliding doors having a linear movement which is the difficulty to achieve sufficient pressure on the door sealing being parallel to the linear movement. Too much pressure on the door sealing during opening or closing would result in unacceptable wear of the door sealing. In addition the door would be difficult to open or close due to the friction between the door sealing and the oven chamber opening.

The hot rack oven according to the present invention achieves an improved sliding door for a rack oven that reduces the wear of the sealing and that is easy to open and to close, but still provides for a sealing of the oven chamber that fulfils high requirement with regard to energy consumption.

The weight of the door is, in one version, approximately 75 kg which also set high demands on the sliding door arrangement as the oven must be able to be opened or closed without using too much force.

In addition, the user must be certain when the door is in the closed position, which is achieved by the hot rack oven by allowing a clear tactile indication to be given when the closed position is reached, i.e. it is clearly felt by the user when the door "sinks" down in the closed position. And when reaching the closed position, the door is smoothly lowered so that the door sealing arrangement above and below the door secures proper sealing of the door.

Furthermore, the door is well-balanced during the whole movement in order to achieve a smooth opening and closing.

SHORT DESCRIPTION OF THE APPENDED DRAWINGS

FIG. 12 a-b shows schematic illustrations of various positions of the wheel arrangement and the guide bar according to another embodiment of the invention.

FIG. 13 shows a perspective view of the guide bar according to one embodiment of the invention.

Figure 14:
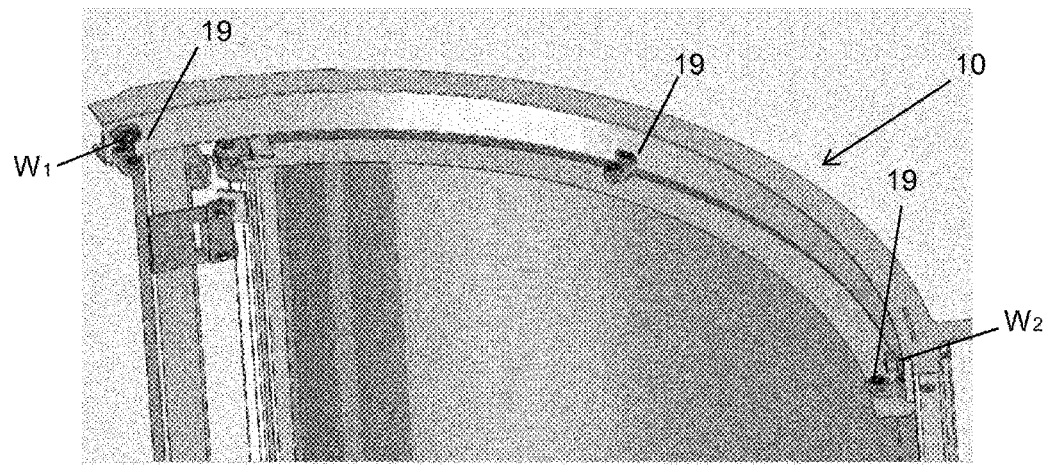
Figure 14:
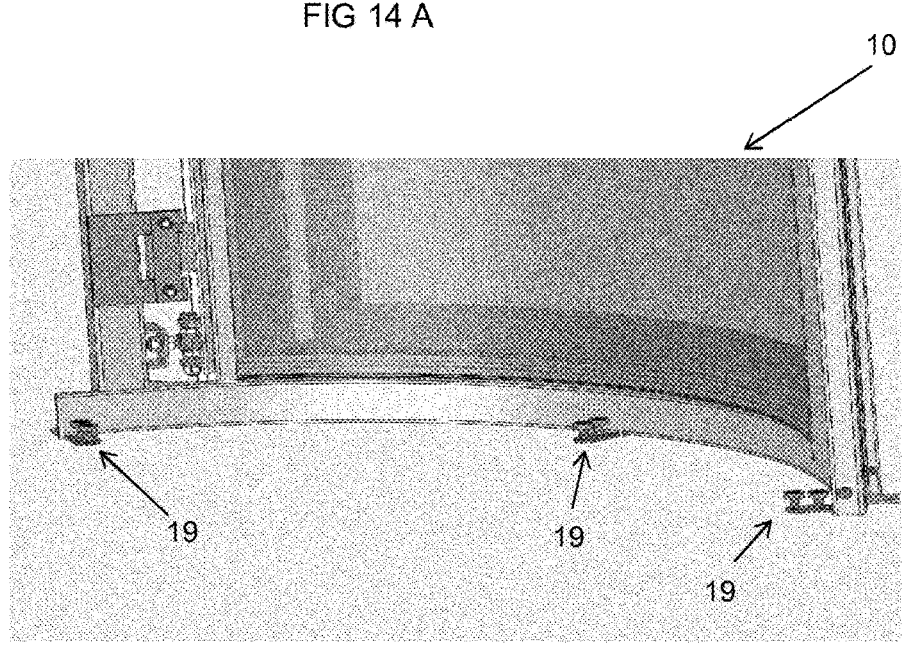

FIG. 14a shows an upper part of a door comprising two wheel arrangements and three bar guiding units FIG. 14b shows a lower part of a door comprising three bar guiding units.

Figure 15:
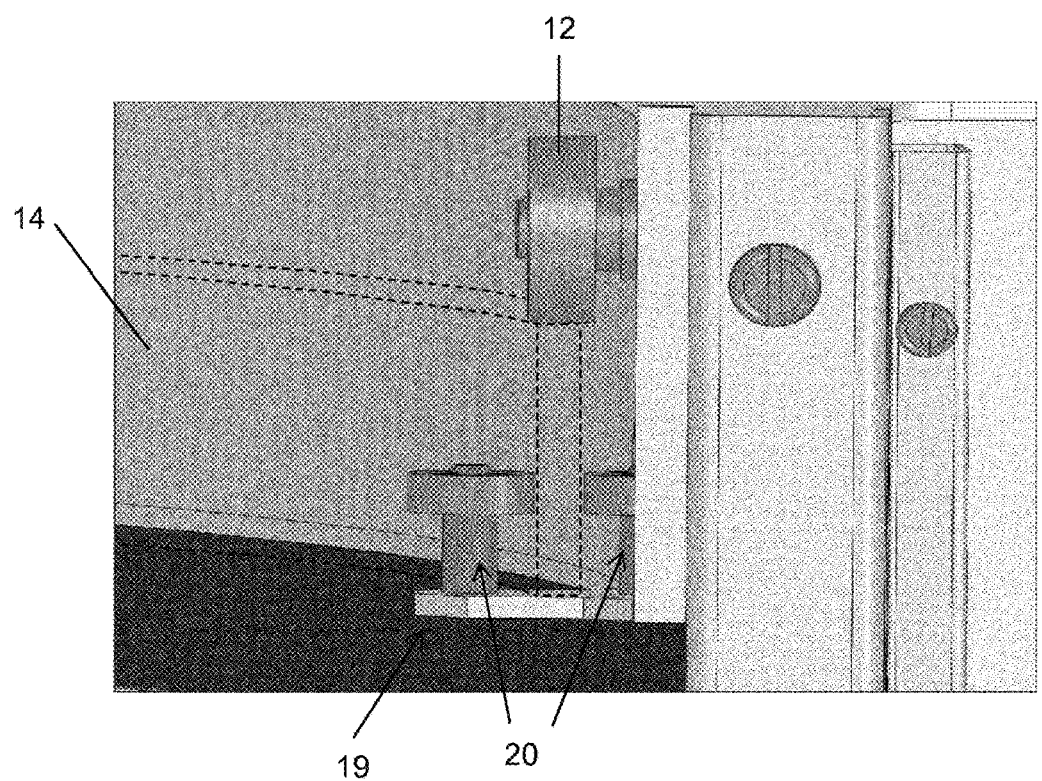

FIG. 15 shows a side view of a wheel arrangement and a bar guiding unit including one pair of guiding wheels on an upper part of a door.

Figure 16:
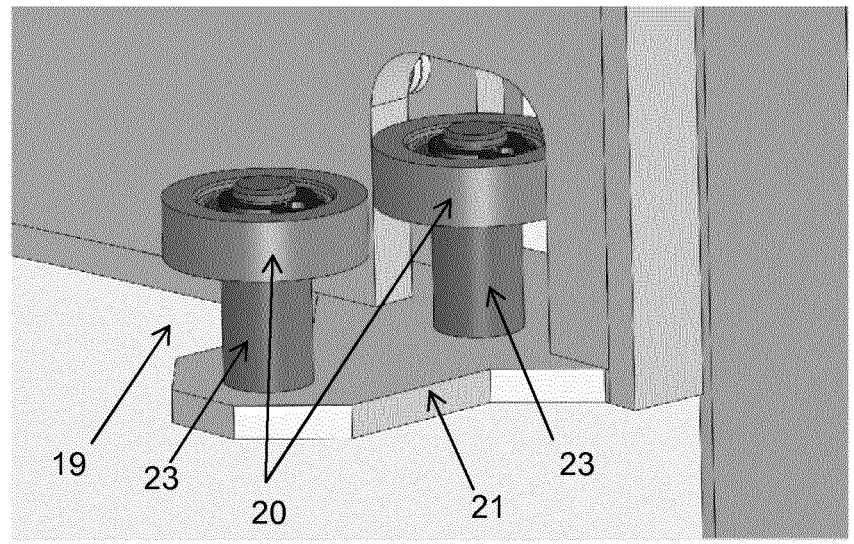

FIG. 16 shows a bar guiding unit including one pair of guiding wheels mounted on a protruding metal plate on an upper part of a door.

Figure 17:
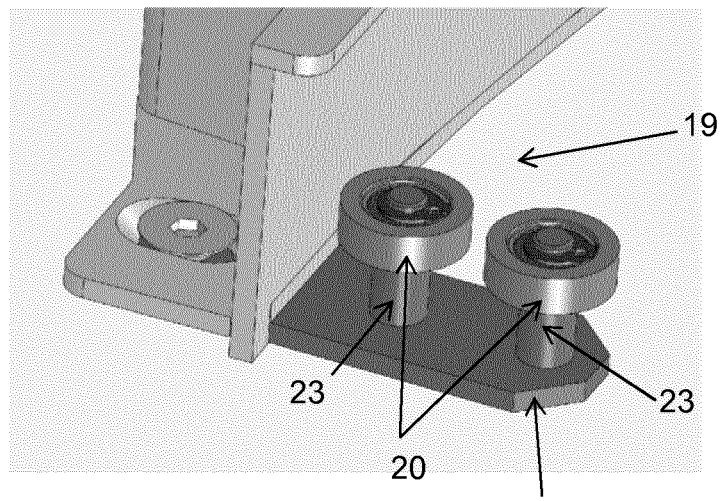

FIG. 17 shows a bar guiding unit including one pair of guiding wheels fastened on a mounting plate on a lower part of a door.

DETAILED DESCRIPTION OF PREFERRED EMBODIMENTS OF THE INVENTION

The invention will now be described in detail by references to the appended figures. In the figures the same or similar items have the same reference signs.

In the following description features which are well-known in the art such as hot air supply and exhaust systems are not described in detail except where necessary to aid comprehension of the invention.

Figure 9:
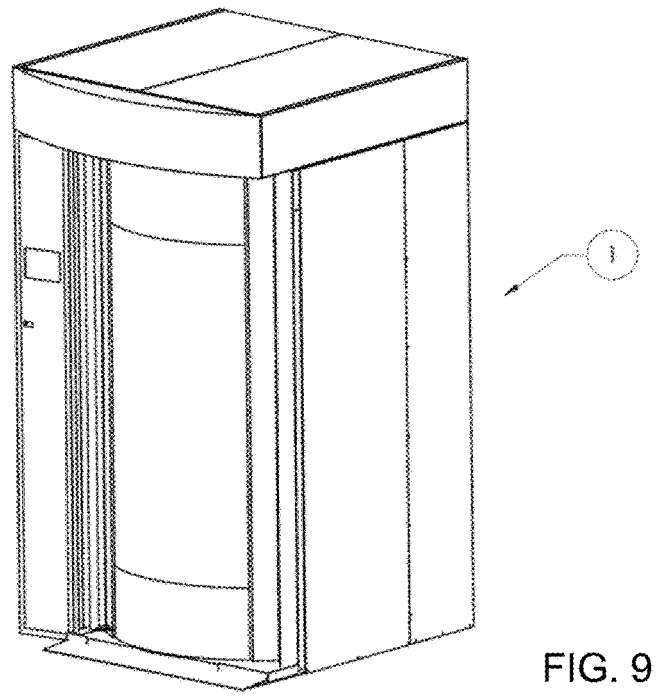
FIG. 9 show a simplified illustration of a hot air rack oven in accordance with the present invention.

Hot air rack oven 1 (see FIG. 9) has an external housing 2 (see e.g. FIG. 1) which encloses an oven chamber 6, a hot air inlet in the form of a vertical series of horizontal openings in the wall of the oven chamber though which hot air is blown into the oven chamber, an exhaust outlet via which hot air is removed from the oven chamber and a door 10. As is normal in baker's ovens, at least some of the exhausted air is conveyed by a fan through suitable ducting past a heater and re-introduced into the oven chamber via hot air inlet. The food products are placed on pans, trays, slings or other suitable supports in a wheeled rack 4 which is transported into the oven chamber 6, and the shape of the openings in the hot air inlet are designed so that hot air will flow in a desired manner through the oven chamber. Preferably the hot air flow is arranged so that the heating of the goods being baked is even, with an even transfer of heat from the top to bottom of the rack and from the outer edge to the centre of the baking tray. This can be achieved by angling the opening upwards so that the air flows hit the baking trays at an upward angle to provide heat to the underside of the goods being baked. The products in the oven are thus heated by being directly touched by a stream of hot air as well as indirectly through the trays that they lie on. The wheeled rack is supported from the ceiling of the oven chamber by a powered rack rotating mechanism for rotating the rack which rotates about a substantially vertical axis.

Oven chamber comprises a chamber wall covered by a ceiling and provided with a floor and a front opening 8 which can be closed by a movable door 10. Unlike previous rack ovens which have oven chambers which have straight walls, and a straight or slightly convex door, such that the oven chamber has a substantially quadratic horizontal cross-section, the oven chamber of the present invention has a horizontal cross-section which is essentially rounded. As can be seen from the cross-section of the rack oven in FIGS. 1-3, the profile of the chamber wall is substantially circular around a vertical axis at least from the height of the wheels of the rack to the full height of the rack when connected to a rack rotating mechanism, and thus substantially is partly cylindrical, although for practical reasons the cylindrical shape is modified in some positions, for example by being made straight, or locally more curved, instead of being smoothly rounded, with some projections away from the interior of the circular shape being provided to permit the mounting and connection of a hot air supply, a possible steam generation system, and other necessary items, and to provide a door opening, an optional entry port, and mounting arrangement for the convex sliding door.

Door 10 is curved with essentially the same diameter (slightly larger) of curvature as the oven chamber wall is, and is able to slide laterally to one side of the opening at the outside of the oven.

In order to allow a rack for 800×600 mm trays to be introduced into the oven the door opening should be at least 760 mm wide, i.e. at least 100 mm wider than the rack in order to allow 50 mm space for the hands of an operator on each side of the rack. If a smaller tray and rack is used, e.g. a 457 mm tray on a rack which, because of its frame it has an extra width of 30 mm each side of the tray, and a hand clearance of 50 mm on each side of the rack is needed, then the door opening should have a minimum width of 617 mm. To allow easy entry of the rack into the oven, the door opening width may be larger e.g. 690 mm or 700 mm for a 457 mm tray.

If smaller or larger racks than those mentioned above are to be used in an oven in accordance with the present invention then the size of the oven must be adjusted accordingly.

Thus, the present invention relates to a hot air rack oven 1 in an oven housing 2, for the baking of goods on a rack 4. The oven comprises an oven chamber 6, a door opening 8, and a door 10. The oven chamber comprises one or more curved portions wall and has an essentially circular cross-section respect to a substantially vertical axis of the oven.

The door 10 is curved with a slightly larger diameter than the outer diameter of the oven chamber 6, and is able to slide laterally to one side of the opening, at the outside of the oven. This is schematically illustrated in the cross-sectional views of FIGS. 1-3. In those figures the part of the oven housing where e.g. the hot air generation and other functional features of the oven are arranged, is briefly indicated by dashed lines.

Figure 1:
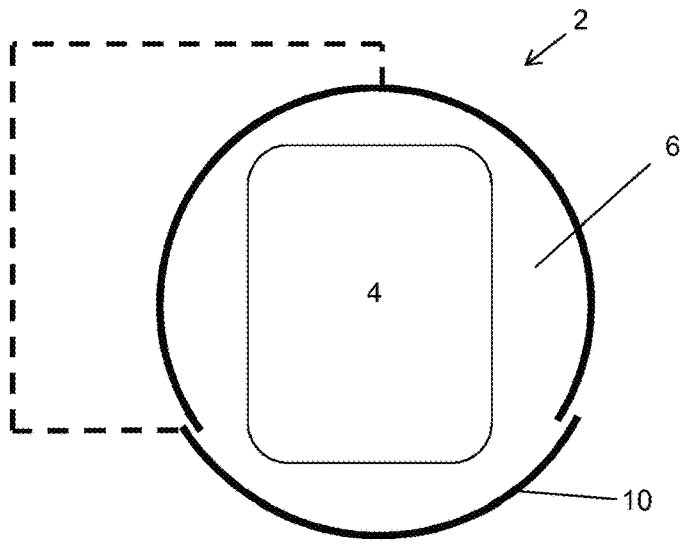
FIGS. 1-3 are cross-sectional views of the hot air rack oven according to the invention, when the door is in different positions.
Figure 2:
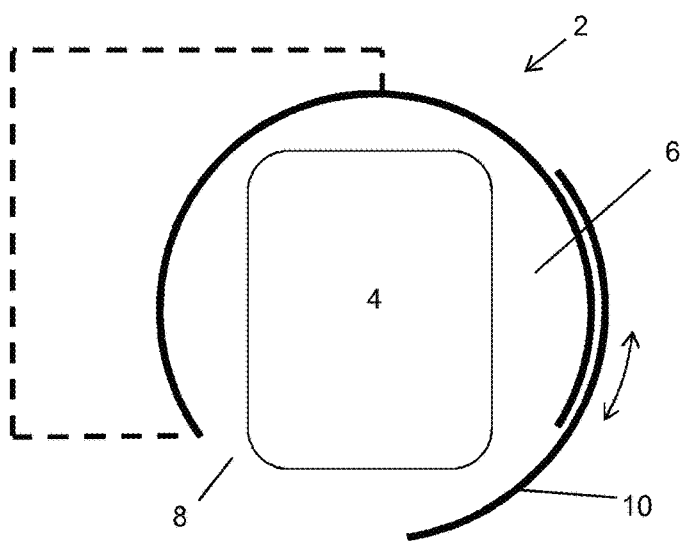
Figure 3:
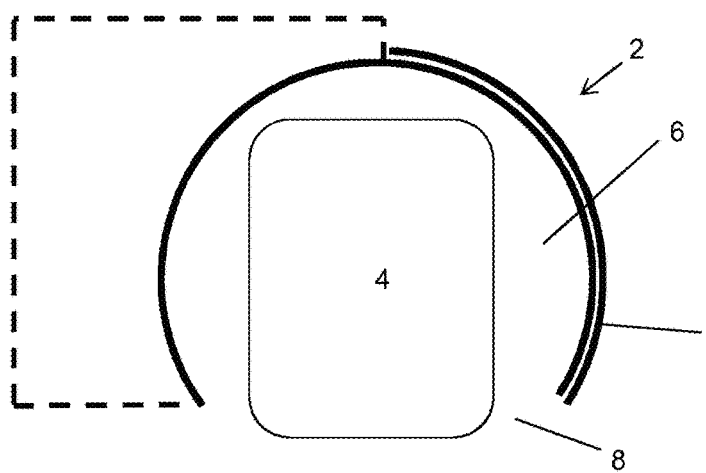

In FIG. 1 the sliding door is closed and the oven chamber is sealed. In FIG. 2 the sliding door is in an opening or closing procedure (indicated by a double-arrow), and in FIG. 3 the door 10 is completely open.

Figure 8:
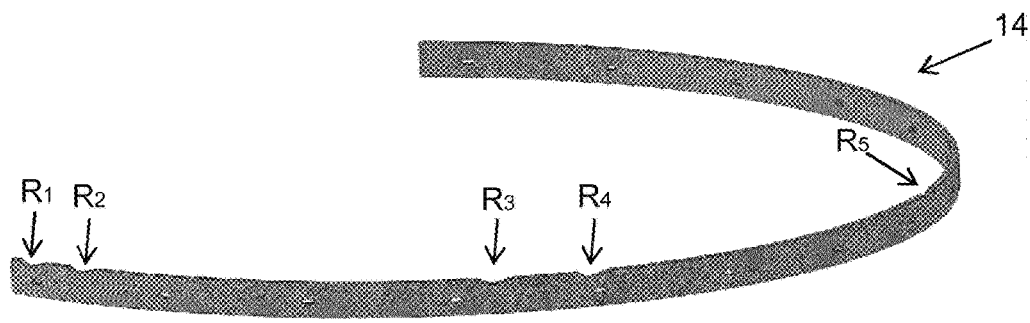
FIG. 8 shows a perspective view of the guide bar according to one embodiment of the invention.

The sliding door 10 is movably arranged at the oven housing via cooperation, at an upper edge of the door, between an elongated curved horizontally arranged wheel arrangement 12 provided with a specified number N of equally sized wheels $W_i$ and an elongated curved horizontally arranged guide bar 14 provided with N equally sized recesses $R_i$. The wheel arrangement 12 and the guide bar 14 are schematically illustrated in FIGS. 4a-4e. A perspective view of the guide bar 14 is shown in FIG. 8.

Figure 4A:
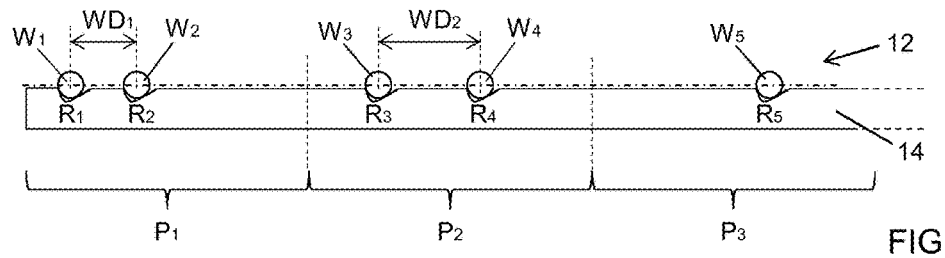
FIGS. 4a-4e show schematic illustrations of various positions of the wheel arrangement and the guide bar according one embodiment of the present invention.

When the door 10 is closed the positions of the wheels $W_i$ along the wheel arrangement 12 correspond to the positions of the recesses $R_i$ along the elongated guide bar 14. This position is illustrated in FIG. 4a. When the door is closed each of the wheels rests in its respective recess.

During lateral movement of the door, i.e. when the door is in the process of being opened or closed, some or all wheels of the wheel arrangement are configured to run along a planar surface of the guide bar.

FIGS. 4a-4e schematically illustrates the cooperation between the wheel arrangement and the guide bar during opening of the door according to one embodiment.

Figure 6:
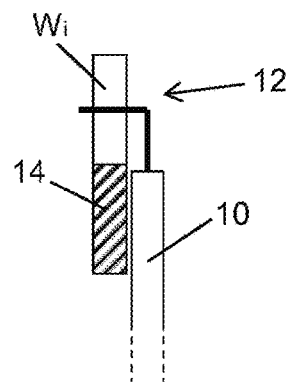
FIG. 6 shows a cross-sectional view of the wheel arrangement and the guide bar according to the present invention.

In this embodiment the elongated guide bar is provided with five recesses ($R_1$-$R_5$), and the elongated wheel arrangement is provided with five wheels ($W_1$-$W_5$) where each wheel is provided with a horizontal rotation axle around which axle each wheel may be rotated. The wheels of the wheel arrangement are configured to run on a planar surface of the guide bar 14. In FIG. 6 a schematic cross-sectional view illustrate that the wheel arrangement is attached to the upper edge of the door 10.

During opening or closing of the door at least three wheels rest at the planar surface of the guide bar. Each of the wheel arrangement 12 and the guide bar 14 comprises, in its respective longitudinal direction, three equally sized portions, a first portion $P_1$, a second portion $P_2$, and a third portion $P_3$.

The first portion $P_1$, being located such that it corresponds to the portion of the door first to reach the oven opening, when the door is being closed. The second portion $P_2$, being located between the first and third portions, and the third portion $P_3$, being located such that it corresponds to the portion of the door last to reach the oven opening, when the door is being closed.

In this embodiment two wheels are arranged in the first portion, two wheels are arranged in the second portion, and one wheel is arranged in the third portion.

According to this embodiment, a distance $WD_1$ (see FIGS. 4a-4e) between rotation axles of the wheels in the first portion differs more than a longitudinal length $R_L$, of a recess (see FIG. 5) in comparison to the distance $WD_2$ between rotation axles of the wheels in the second portion.

Thereby is achieved that the wheels may pass recesses such that at least one wheel in each portion is in contact with the guide bar when the door is in all positions except when it has reached the closed position, see FIG. 4a.

This may be expressed by the following relationship:

$$|WD_1 - WD_2| > R_L$$

Figure 4B:
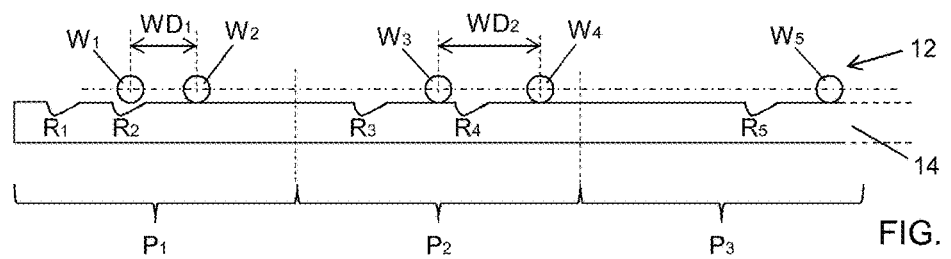

In FIG. 4b wheel $W_1$ passes recess $R_2$, but the door is supported by wheel $W_2$ in the first portion $P_1$. In portions $P_2$ and $P_3$ all wheels are in contact with the guide bar.

It should be noted that the guide bar 14 is provided with a fourth portion $P_4$, having essentially the same length as portions $P_1$-$P_3$ together, that continues from portion $P_3$ and along an upper periphery of the oven housing. FIG. 8 is an illustration of the entire guide bar 14. When the door is completely open the wheel arrangement 12 cooperates essentially only with portion $P_4$.

Figure 4C:
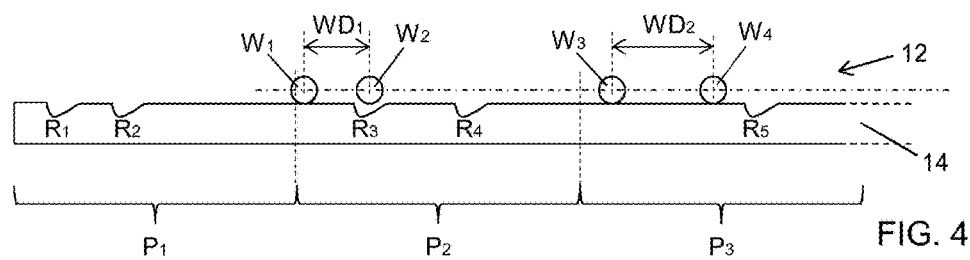

In FIG. 4c the door is opened a bit more than in FIG. 4b. Here wheel $W_2$ is above recess $R_3$ but the door is supported by wheel $W_1$ in the second portion $P_2$.

Figure 4D:
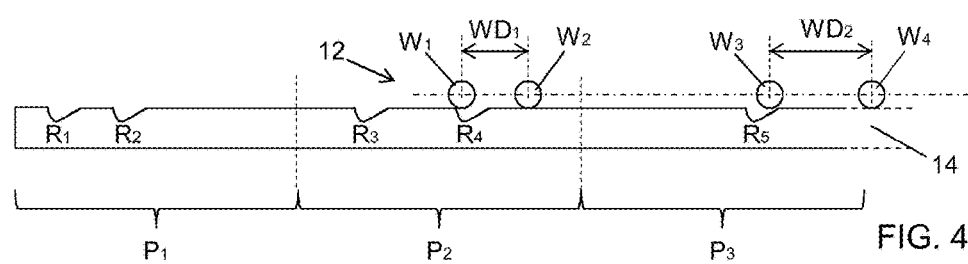

In FIG. 4d wheels $W_1$ and $W_3$ are above respective recesses $R_4$ and $R_5$ and the door is supported by wheel $W_2$ in the second portion $P_2$ and by wheel $W_4$ in the third portion $P_3$.

Figure 4E:
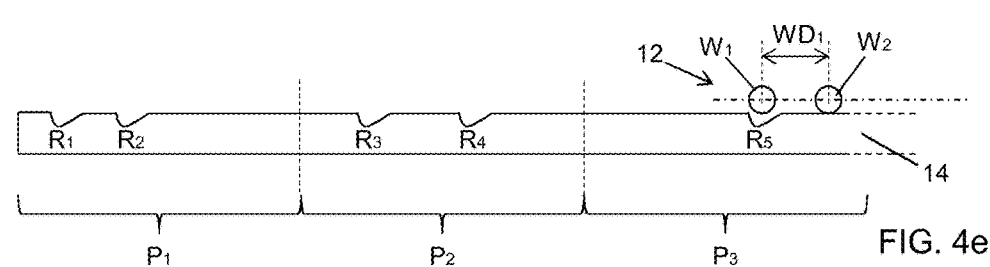

And finally FIG. 4e illustrates a situation where the door is almost open, here wheel $W_1$ is above recess $R_5$ but the door is supported by wheel $W_2$ in the third portion $P_3$.

The described cooperation between the wheel arrangement and the guide bar ensures that the door is well balanced during the whole movement procedure from an opened to a closed position. In particular this is achieved by assuring that the door is supported during the whole procedure in each of the portions $P_1$-$P_3$; especially in the second portion $P_2$ as the curved cross-sectional shape of the door would be unbalanced if only being supported in portions P1 and P3.

In the illustrated embodiment the number N of wheels and recesses is five. However, it is naturally possible to have more wheels and recesses as long as the number of wheels and recesses is the same and that the positions of the wheels and recesses correspond when the door is closed.

When the door is about to reach the closed position the door will slowly be lowered as the door finally reaches the final closed position. During this procedure the sealing at the upper and lower edges of the door will be activated, i.e. firmly pressed, such that the opening to the oven chamber is sealed by the door.

Figure 5:
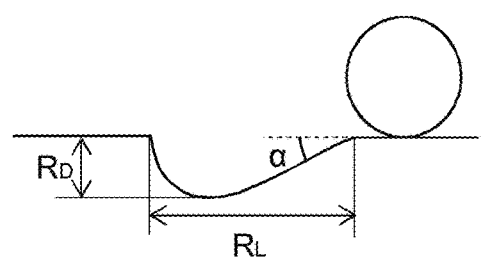
FIG. 5 shows a side view of a recess according to one embodiment of the invention.

FIG. 5 illustrate one recess having a length $R_L$, being approximately 20-35 mm, depending on wheel size and the angle α, and a depth $R_D$ of approximately 3-10 mm, preferably 3-8 mm, and most preferred 5 mm. The wheel $W_i$ has a diameter related to $R_D$ and is approximately 20-40 mm, preferably 25-35 mm. Each recess is preferably wedge-shaped and being provided with an acute angle α on the side of the recess which each wheel enters first during a door closing procedure. The angle α is in the interval 5-25 degrees, and preferably 7-18 degrees and is depending on the weight of the door, heavier door less angle. At the other side of the recess the angle is larger such the wheel that enters the recess is prevented from continue.

The above details regarding the recess are applicable for all embodiments in the present application.

The recess may naturally have other shapes, e.g. a semi-circular shape.

Figure 7:
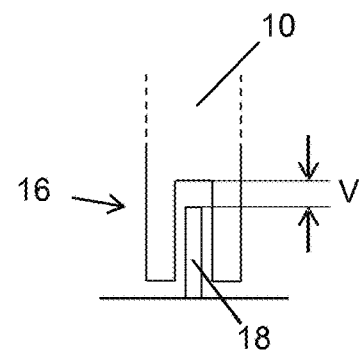
FIG. 7 show a cross-sectional view of first and second guides according to one embodiment of the invention.

The lower edge of the door 10 is provided with a first guide 16 configured to cooperate with a second guide 18 at the oven (see FIG. 7). The first and second guides provides for steering of the lower part during movement of the door and enables vertical movement, a predetermined distance V, of the door when the door approaches its closed position. The distance V is related to the depth of a recess $R_D$.

The first and the second guide display the same curved shape as the wheel arrangement and the guide bar.

Preferably, the floor of the entrance into the oven chamber is essentially even which is advantageous in that racks then easily may be rolled into the oven chamber. In order for the door to be steered during the movement, and in particular when about to reach the closed position, the first guide continuous further along the periphery defined by the lower edge of the door in the direction away from the oven opening. The length of the first guide is approximately twice the length of the curved door, which ensures that the door is guided also when reaching the closed position.

In the embodiment illustrated above the wheel arrangement 12 is arranged at the upper part of the sliding door and the elongated guide bar is arranged at the housing above the oven opening and along an upper perimeter of the oven.

In an alternative version the elongated guide bar is arranged at the upper part of the sliding door and the wheel arrangement is arranged at the housing above the oven opening and along an upper perimeter of the oven. Thus, the guide bar is arranged above the wheel arrangement.

Figure 10:
FIGS. 10 and 11 illustrate another embodiment of the invention.
Figure 11:
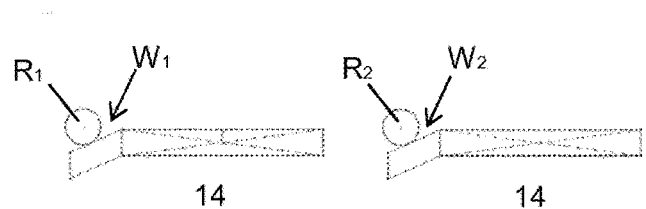

FIGS. 10 and 11 illustrate another embodiment of the invention.

This embodiment is especially for smaller ovens where the sliding door is less heavy.

Herein only two wheels $W_1$ $W_2$ are arranged which cooperate with two recesses $R_1$ $R_2$. The wheels are arranged at the upper edge of the door such that when the door reaches the closed position the wheels rest in the recesses.

A further embodiment is illustrated in FIGS. 12-17. Herein two wheels $W_1$ and $W_5$ are arranged which cooperate with two recesses $R_1$ and $R_5$. The cooperation between the wheel arrangement 12 and the guide bar 14 during opening of the door in this further embodiment is schematically illustrated in FIGS. 12A and 12B. When the door reaches the closed position the wheels $W_1$ and $W_5$ rest in the recesses $R_1$ and $R_5$, respectively, of the guide bar (see FIG. 12A). During opening or closing of the door both wheels rest on the planar surface of the guide bar (see FIG. 12B illustrating when the door is being opened). Hence, this is true for all positions except for when the door has reached the closed position, see FIG. 12A, where both wheels rest in recesses $R_1$ and $R_5$. In this embodiment the wheels are referred to as $W_1$ and $W_5$ and the recesses are referred to as $R_1$ and $R_5$ as they correspond to the wheels and recesses described in earlier embodiments herein.

In addition, at least three bar guiding units 19 are arranged in the upper and the lower part of the sliding door, respectively. The bar guiding units 19 are positioned in each end of the upper and lower part of the door and one guiding unit 19 is substantially centrally positioned in the upper and lower part of the door. One bar guiding unit 19 preferably comprises two guiding wheels 20 mounted on essentially vertical axes 23. A bar guiding unit according to this embodiment may also comprise alternatives to bar guiding wheels which provide the same function, e.g. be realized by vertical rods.

The bar guiding units 19 are provided for keeping the guide bar 14 in a correct position in relation to the wheels of the wheel arrangement 12 during the entire motion of the door from the closed (FIG. 12A) to the open position. This is achieved by configuring the guiding wheels 20 of a bar guiding unit 19 such that the horizontal distance between the horizontal surfaces of the wheels is slightly larger than the width of the guide bar 14. Thereby the door is accurately guided in relation to the guide bar during its motion.

FIG. 13 illustrates a guide bar 12 of this embodiment having two recesses $R_1$ and $R_5$. The guide bar is realized as one single piece arrangement.

FIG. 14A illustrates the upper part of a door 10 arranged with two wheels $W_1$ and $W_5$. The wheels $W_1$ and $W_5$ are arranged at the upper edges of the sliding door close to the upper corners. The door is also provided with one pair of guiding wheels 20 in each upper end of the door, respectively, and one pair of guiding wheels 20 substantially centrally positioned on the upper part of the door.

FIG. 14B illustrates the lower part of a door 10. The door is provided with one pair of guiding wheels 20 in each lower end of the door, respectively, and one pair of guiding wheels 20 substantially centrally positioned on the lower part of the door 10.

FIG. 15 illustrates a wheel arrangement 12 and a pair of guiding wheels 20 positioned on the upper part of a door 10. A guide bar 14 is arranged between the guiding wheels 20 so that the guiding wheels 20 keep the guide bar in a correct position in relation to the wheels of the wheel arrangement 12 when the door is in motion.

FIG. 16 shows a guiding unit 19 securely attached on the upper part of the door 10 on a metal plate 21 forming a part of the door frame construction. The guiding wheels 20 of the guiding unit 19 are mounted on essentially vertical axes 23.

FIG. 17 shows a guiding unit 19 attached on a detachable protruding metal mounting plate 22 on the lower part of the door 10. The guiding wheels 20 of the guiding unit 19 are mounted on essentially vertical axes 23.

The frame of the door 10 is preferably continuous and has a rectangular shape to allow for attachment of the wheels and the bar guiding units 19 thereto.

The upper bar guiding units 19 are firmly attached to the sliding door 10 by e.g. welding protruding metal plates 21 having a thickness of material of approximately 3 mm.

Preferably, two of the upper bar guiding units 19 are positioned in close proximity to wheels $W_1$ and $W_5$. The lower bar guiding units 19 are preferably detachable and radially slidable by being attached to a mounting plate 22 which is movable. The lower bar guiding units 19 are thereby radially adjustable to compensate for any eccentricity between the upper and the lower guide bar 14. In order to save space radially mounting plate 22 is governed by protruding taps so that only one screw is needed for the attachment.

The cooperation between the wheel arrangement 12 and the guide bar 14 ensures that the door is well-balanced during the movement procedure from an opened to a closed position.

The upper bar guiding units 19 are thus provided to prevent derailment of the door and the lower bar guiding units 19 are provided to absorb torque, e.g. preventing the lower part of the door from swinging into the oven chamber. The usage of guiding wheels 20 provides for a guiding of the door which is substantially continuous, uninterrupted and silent and which allows for a significantly lower friction. Another advantage of using bar guiding units 19 provided with a pair of wheels 20 is that the arrangement will not be affected by small differences in concentricity between the upper and the lower guide bar 14.

In an alternative version of the above embodiment the elongated guide bar is arranged at the upper part of the sliding door and the wheel arrangement comprising $W_1$ and $W_5$ and the guiding units arranged at the housing above the oven opening and along an upper perimeter of the oven. Thus, the guide bar is arranged above the wheel arrangement.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A hot air rack oven for the baking of goods on a rack, the hot air rack oven comprises an oven housing, an oven chamber, a door opening, a door, a wheel arrangement, and a guide bar, the oven chamber comprises one or more curved portions wall and has an essentially circular cross-section in respect of a substantially vertical axis of said oven, wherein said door is curved with a slightly larger diameter than the outer diameter of the oven chamber, and is able to slide laterally to one side of the opening, at the outside of the oven, and the sliding door is movably arranged at said oven housing via cooperation, at an upper edge of said door, between said elongated curved horizontally arranged wheel arrangement provided with a specified number N of equally sized wheels $W_i$ and said elongated curved horizontally arranged guide bar provided with N equally sized recesses $R_i$, and the positions of the wheels $W_i$ along the wheel arrangement correspond to the positions of the recesses $R_i$ along the elongated guide bar when the door is closed, wherein when the door is about to reach a closed position the door will be lowered as the door finally reaches a final closed position, and when the door is closed each of the wheels rest in its respective recess, and during lateral movement of the door some or all wheels of the wheel arrangement are configured to run along a planar surface of the guide bar; and wherein each of the wheel arrangement and the guide bar comprises, in its respective longitudinal direction, three essentially equally sized portions, a first portion $P_1$, a second portion $P_2$, and a third portion $P_3$, wherein at least two wheels are arranged in the first portion, at least two wheels are arranged in the second portion, and at least one wheel is arranged in the third portion, wherein the distance $WD_1$ between rotation axles of the wheels in the first portion differs more than a longitudinal length $R_L$ of a recess in comparison to the distance $WD_1$ between rotation axles of the wheels in the second portion.

2. The hot air rack oven according to claim 1, wherein said elongated guide bar is provided with at least five recesses ($R_1$-$R_5$), and said elongated wheel arrangement is provided with at least five wheels ($W_1$-$W_5$) where each wheel is provided with a horizontal rotation axle around which axle each wheel may be rotated.

3. The hot air rack oven according to claim 2, wherein during opening or closing of the door at least three wheels rest at the planar surface of the guide bar.

4. The hot air rack oven according to claim 1, wherein said elongated guide bar is provided with two recesses $R_1$ and $R_5$ and said elongated wheel arrangement is provided with two wheels ($W_1$ and $W_5$) where each wheel is provided with an essentially horizontal rotation axle around which axle each wheel may be rotated.

5. The hot air rack oven according to claim 4, wherein said two wheels are arranged at the upper corners of the door and wherein the door is in a closed position when the wheels $W_1$ and $W_5$ rest in the recesses $R_1$ and $R_5$, respectively of said guide bar.

6. The hot air rack oven according to claim 5, wherein said wheel arrangement is further provided with one or more bar guiding units, and each bar guiding unit comprises two guiding wheels (20).

7. The hot air rack oven according to claim 6, wherein three bar guiding units are arranged on the upper part of the door and three bar guiding units are arranged on the lower part of the door.

8. The hot air rack oven according to claim 4, wherein said wheel arrangement is further provided with one or more bar guiding units, and each bar guiding unit comprises two guiding wheels.

9. The hot air rack oven according to claim 8, wherein three bar guiding units are arranged on the upper part of the door and three bar guiding units are arranged on the lower part of the door.

10. The hot air rack oven according to claim 1, wherein during opening or closing of the door at least three wheels rest at the planar surface of the guide bar.

11. The hot air rack oven according to claim 1, wherein each recess has a depth $R_D$ of approximately 3-6 mm.

12. The hot air rack oven according to claim 1, wherein each recess is wedge-shaped and being provided with an acute angle a on the side of the recess which each wheel enters first during a door closing procedure.

13. The hot air rack oven according to claim 1, wherein a lower edge of said door is provided with a first guide configured to cooperate with a second guide at said oven, such that said first and second guides provides for steering of the lower part during movement of the door and enables vertical movement of the door when the door approaches its closed position.

14. The hot air rack oven according to claim 10, wherein a lower edge of said door is provided with a first guide configured to cooperate with a second guide at said oven, such that said first and second guides provides for steering of the lower part during movement of the door and enables vertical movement of the door when the door approaches its closed position.

* * * * *